June 10, 1924.  J. W. A. DUDEN  1,497,074
SPOOL FOR ROLL FILMS AND LIKE PHOTOGRAPHIC MATERIAL
Filed Aug. 6, 1923
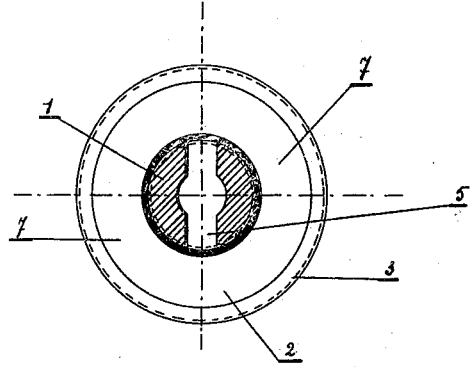
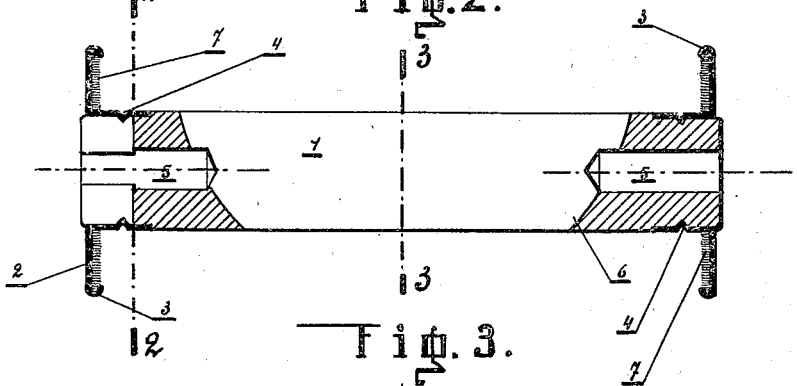
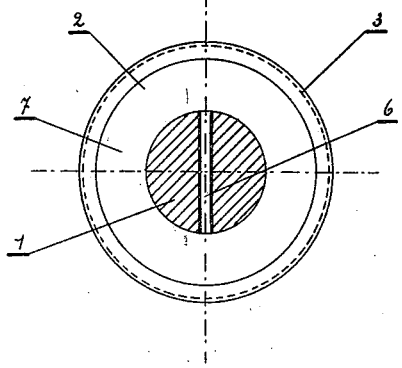
Inventor:
Johannes William Anton Duden
per: Attorney Patented June 10, 1924.

1,497,074

UNITED STATES PATENT OFFICE.

JOHANNES W. A. DUDEN, OF VIEUX-DIEU, NEAR ANTWERP, BELGIUM, ASSIGNOR TO GEVAERT PHOTO-PRODUCTEN, NAAMLOOZE-VENNOOTSCHAP, OF VIEUX-DIEU, NEAR ANTWERP, BELGIUM.

SPOOL FOR ROLL FILMS AND LIKE PHOTOGRAPHIC MATERIAL.

Application filed August 6, 1923. Serial No. 656,121.

*To all whom it may concern:*

Be it known that I, JOHANNES WILLEM ANTON DUDEN, engineer, a subject of the King of the Belgians, residing at Vieux-Dieu, near Antwerp, Ridder Van Ranstlei 59, Belgium, have invented a new and useful Improvement in Spools for Roll Films and Like Photographic Material, of which the following is a specification.

The present invention relates to an improvement in spools for roll-films, photographic paper, and the like. The spools usually comprise a wooden spool-shaft or a metal spool-shaft, on the ends of which are secured metal or other end-flanges, in such a manner that photographic material in the form of a band may be wound between the two perfectly spaced end-flanges. It is well known that the photographic material on the spool is liable to deteriorate when light or air is able to filter through between the end-flanges of the spool and the sides of the roll of photographic material wound on the latter. The object of the present invention is to avoid such drawback and further to prevent the roll of material to become partially unwound owing to slackness during manipulation of the spool, that is to say when the latter is introduced in or removed from the camera; the invention moreover comprises means for securing the end-flanges firmly and rigidly on the ends of the spool-shaft.

The accompanying drawing shows an improved spool according to the invention, Fig. 1 being a longitudinal section through the said spool and Figs. 2 and 3 being transverse sections on the line 2—2 and 3—3 of Fig. 1 respectively.

Referring to the said drawing, 1 indicates the wooden spool shaft and 2 the two end-flanges. These end-flanges 2 are according to the invention turned back inwardly at their periphery so as to form a beaded edge 3, whereas heretofore this beading has usually been formed by turning the periphery of the end-flanges back outwardly. The annular space thus formed within the beaded edge 3 on the inner side of the end-flanges 2 is according to the invention filled with a lining 7, which acts to prevent the penetration of air and light. This lining 7 should preferably consist of velvet cloth or chamois-leather or of any other material equally suitable for the purpose as explained hereafter. In order to secure the end-flanges 2 as firmly and as rigidly as possible on the spool-shaft 1, the central cylindrical sleeves on the said end-flanges are provided with a circumferential groove 4 which engages the ends of the spool-shaft 1. This groove is formed at the same time as the sleeves of the end-flanges are fitted onto the ends of the said spool-shaft 1. The spool is provided in the well known manner with the holes 5 serving to keep said spool in position in the cameras, and a diametrical slot having converging sides 6 when seen in longitudinal section is provided as usual to allow the introduction of the point shaped end of the band of photographic material to be wound on the spool. The lining 7 prevents the light and the air from filtering through between the end-flanges and the sides of the roll of material on the spool and the friction existing owing to the said lining between the end-flanges and the said roll of material, in cooperation with the inwardly beaded edges 3, prevents this roll of material from becoming slack or partially unwound during manipulation, the type of material employed for the lining 7 being suitably chosen to attain this result: It would seem that velvet cloth, plush, or chamois-leather are the materials which better answer this purpose.

The stamping of the groove 4 in the circumference of the sleeve of the end-flanges 2 results in these end-flanges being secured with much greater firmness and rigidity on the spool shaft 1, being kept better adjusted thereon, and being better able to resist shocks and falls, so that the improved spools according to the invention give longer and better service than those heretofore used.

I claim:

1. In a spool for roll-films and like photographic material, the combination with a spool-shaft of the usual type of a pair of fixed end-flanges having a central cylindrical sleeve adapted to fit securely over the ends of the said spool-shaft, and a lining of velvety material applied on the inner face of said end-flanges, substantially as described.

2. In a spool for roll-films and like photographic material, the combination with a spool-shaft of the usual type of a pair of fixed end-flanges having a central cylindrical sleeve adapted to fit securely over the ends of the said spool-shaft, a lining of velvety material on the inner face of the end-flanges, and a peripherical beading formed on said end-flanges by turning back their circumferential edge inwardly over the circumferential edge of the aforesaid lining in such a manner as to secure the latter in the said beading.

3. In a spool for roll-films and like photographic material, the combination with a spool-shaft of the usual type of a pair of fixed end-flanges having a central cylindrical sleeve adapted to fit over and provided with a circumferential groove engaging the ends of the said spool-shaft, an inwardly bent-over beaded edge formed at the periphery of said end-flanges and a lining of material of velvety nature secured by means of the said beaded edge on the inner face of said end-flanges.

In testimony whereof I signed hereunto my name in the presence of two subscribing witnesses.

J. W. A. DUDEN.

Witnesses:
  C. A. WEBBER,
  J. G. BLOCHOUSE.